(12) United States Patent
Barat et al.

(10) Patent No.: US 7,728,307 B2
(45) Date of Patent: Jun. 1, 2010

(54) MEASUREMENT AND TREATMENT OF A SIGNAL COMPRISING STACKS OF ELEMENTARY PULSES

(75) Inventors: Eric Barat, Limours en Hurepoix (FR); Thomas Brisset, Rambouillet (FR); Thomas Dautremer, Paris (FR); Thomas Trigano, Paris (FR)

(73) Assignee: Commissariat a l'Energie Atomique, Paris (FR)

( * ) Notice: Subject to any disclaimer, the term of this patent is extended or adjusted under 35 U.S.C. 154(b) by 166 days.

(21) Appl. No.: 11/579,757

(22) PCT Filed: May 18, 2005

(86) PCT No.: PCT/FR2005/001244

§ 371 (c)(1),
(2), (4) Date: Nov. 3, 2006

(87) PCT Pub. No.: WO2005/121835

PCT Pub. Date: Dec. 22, 2005

(65) Prior Publication Data

US 2008/0025385 A1 Jan. 31, 2008

(30) Foreign Application Priority Data

May 19, 2004 (FR) .................................. 04 05457

(51) Int. Cl.
*G01T 1/00* (2006.01)
(52) U.S. Cl. ....................................... 250/395
(58) Field of Classification Search ................... 250/395
See application file for complete search history.

(56) References Cited

U.S. PATENT DOCUMENTS 5,210,423 A * 5/1993 Arseneau .................... 250/369
2004/0036025 A1 2/2004 Wong et al.

OTHER PUBLICATIONS

Pomme, S., "How pileup rejection affects the precision of loss-free counting," Nuclear Instruments & Methods in Physics Research, Section A: Accelerators, Spectrometers, Detectors and Associated Equipment, vol. 432 (1999) pp. 456-470.

(Continued)

*Primary Examiner*—David P Porta
*Assistant Examiner*—Carolyn Igyarto
(74) *Attorney, Agent, or Firm*—Blakely, Sokoloff, Taylor & Zafman LLP

(57) ABSTRACT

The invention relates to a method of measurement, comprising treatment of a signal consisting of a succession of temporally spaced main pulses, having a duration D and energy E, which can each consist of a stack of elementary pulses having a duration Di and whose energy is evaluated by a variable Ei having an additivity property, wherein said elementary pulses have instants of appearance Ti following a homogeneous Poisson process of an intensity $\lambda$, characterized in that said method comprises the following steps: digitization of the signal; measurement of the duration D and energy E for each main pulse in order to create duration-energy pairs (D,E); determination of the energy pairs (Di,Ei) of the elementary pulses from the constructed pairs (D, E); deduction of energy Ei of each elementary pulse from the determined pairs (Di,Ei). The invention also relates to a signal analysis device comprising means which can implement the method according to the invention.

27 Claims, 12 Drawing Sheets

OTHER PUBLICATIONS

Pomme, S., et al., "Influence of pileup rejection on nuclear counting, viewed from the time-domain perspective," Nuclear Instruments & Methods in Physics Research, Section A: Accelerators, Spectrometers, Detectors and Associated Equipment, vol. 426 (1999) pp. 564-582.

* cited by examiner

Prior ar

MEASUREMENT AND TREATMENT OF A SIGNAL COMPRISING STACKS OF ELEMENTARY PULSES

The present patent application is a non-provisional application claiming the benefit of International Application No. PCT/FR2005/001244, filed May 18, 2005.

The present invention generally relates to the analysis of signals containing a plurality of main pulses each possibly consisting of a pileup of unknown elementary pulses which it is sought to identify.

More precisely, the present invention concerns a measurement method comprising the processing of a signal containing a succession of main pulses of duration D and energy E spaced in time from each other and each possibly consisting of a pileup of elementary pulses of duration Di and whose energy is evaluated by a variable Ei having an additive property in the mathematical meaning of the word, said elementary pulses having times of arrival Ti which follow a homogeneous Poisson process of intensity $\lambda$.

Generally said signals can be representative of flow, and more particularly the flow of photons.

Methods of this type are already known, in particular in the area of gamma spectrometry.

It is recalled that the purpose of gamma spectrometry is firstly to characterize radionuclides contained in an emitting gamma photon source, and secondly to measure the activity of this source (it is typically defined by a number of disintegrations per second or by a unit known as the Becquerel).

Figure 1:
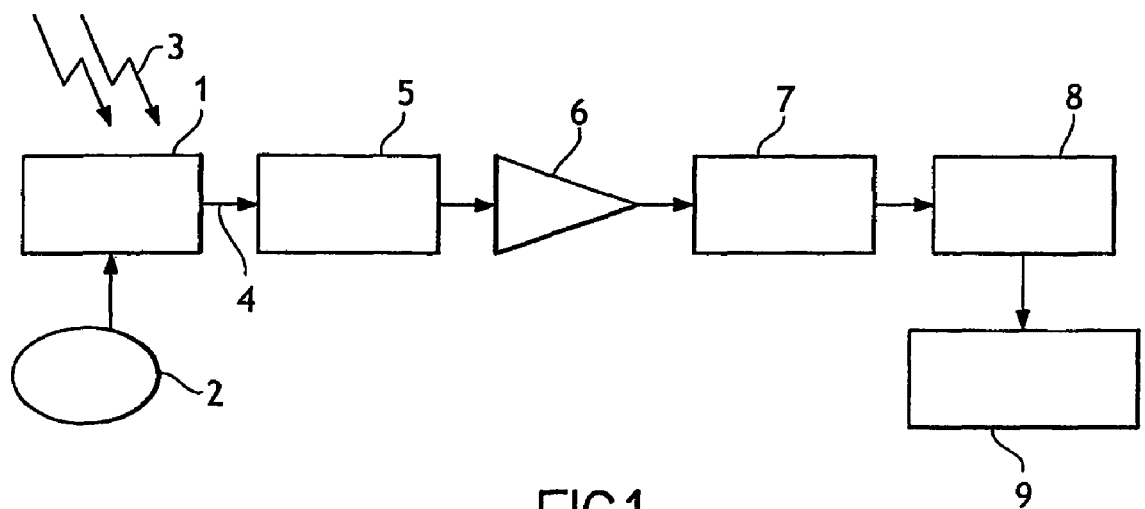

An example of a device able to implement said processing is illustrated FIG. 1.

A detector 1 provided with a power source 2 converts a photon signal 3 into an electric signal 4.

This electric signal is then processed by a preamplifier 5 which increases the signal to noise ratio.

An amplifier 6 is then used to present an adequate signal at one input at least of an electronic acquisition unit 7.

Said unit typically consists of an analog-digital converter.

At the output of this unit, the digitized signal is sent to a processing unit 8 in which specific operations are conducted.

By way of example, the processing unit 8 may in particular contain circuits able to carry out digital filtering of signals.

Finally, a display system 9 completes said chain of acquisition to assist the user in analyzing the composition of a gamma emitting source.

Figure 2:
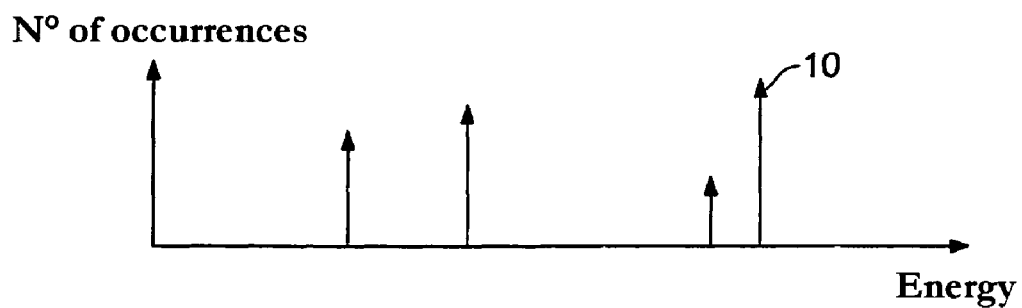

FIG. 2 typically illustrates what can be seen on said display system.

In this figure different rays can be seen each representing a quantified energy value (e.g. ray 10).

All these rays together characterize a specific gamma emitting radionuclide (e.g. caesium 137 has a monoenergetic ray at 662 keV, or cobalt 60 has two monoenergetic rays at 1.173 MeV and 1.333 MeV).

The identification of radionuclide(s) or more generally of a gamma emitting source using said spectrometry devices can however give rise to some difficulties.

In particular three types of disturbances are known, able to deteriorate a spectrum of ideal rays associated with a radionuclide:
  a Compton effect
  the addition of a measurement noise to an ideal signal
  possible pileup of pulses each representing a photon.

Compton Effect and Measurement Noise

When a photon enters into interaction with a detector, an electric pulse is created, then amplified as described previously for FIG. 1.

Figure 3:
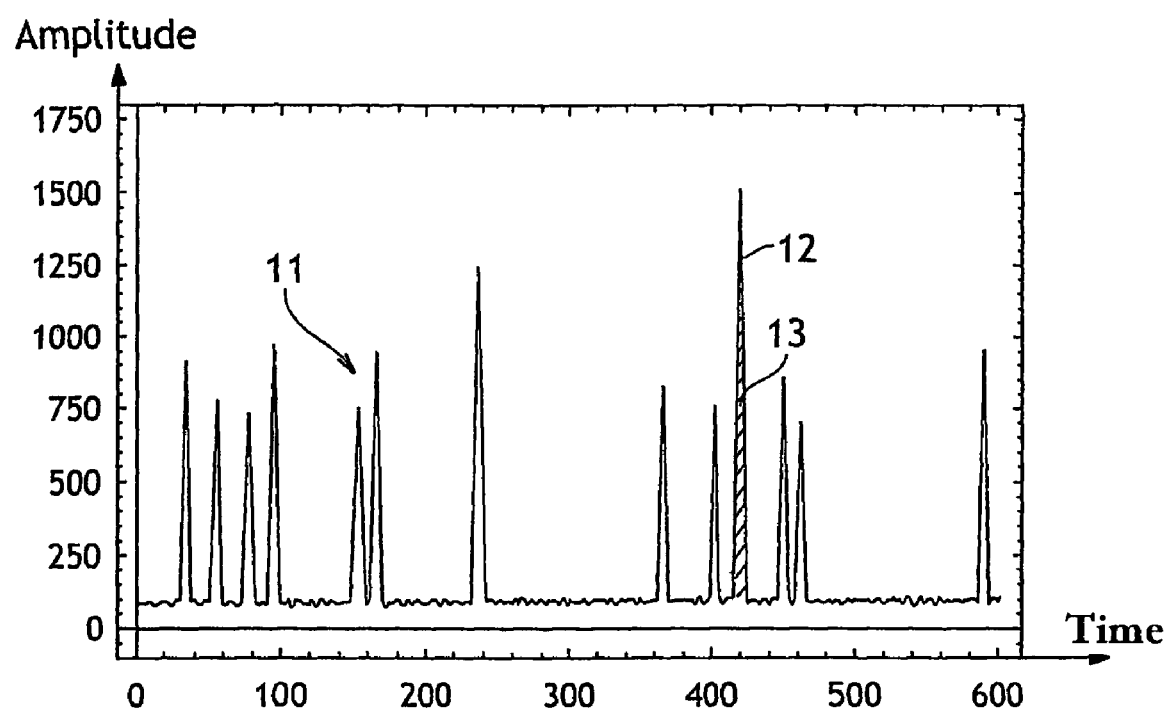

An example of a time signal 11 generated by said detector is illustrated FIG. 3.

It can be seen that this signal consists of a succession of electric pulses of different amplitude and duration, each pulse ideally corresponding to the interaction of a single photon with the detector.

Said signal 11 can be used to measure the energy of the detected photons, since the surface area of an electric pulse (e.g. the area 13 of pulse 12) is proportional to the energy of the photon associated with the pulse under consideration.

It is therefore possible, from different electric pulses 11, to deduce all the energy rays of the observed source.

However, two phenomena disturb this principle of measurement.

First, on account of a Compton effect (this effect is known to those skilled in the art) only part of the energy of a photon is likely to be deposited in the detector.

And spectrometric analysis of a photon which has undergone said effect then produces a ray of lesser energy than should actually be observed.

Secondly, even if the entirety of the energy of a photon is deposited, the area of the created electric pulse is only approximately proportional to said energy due to the intrinsically random nature of the interaction between said photon and the detector, and to the noise contributed by measurement electronics.

Figure 4:
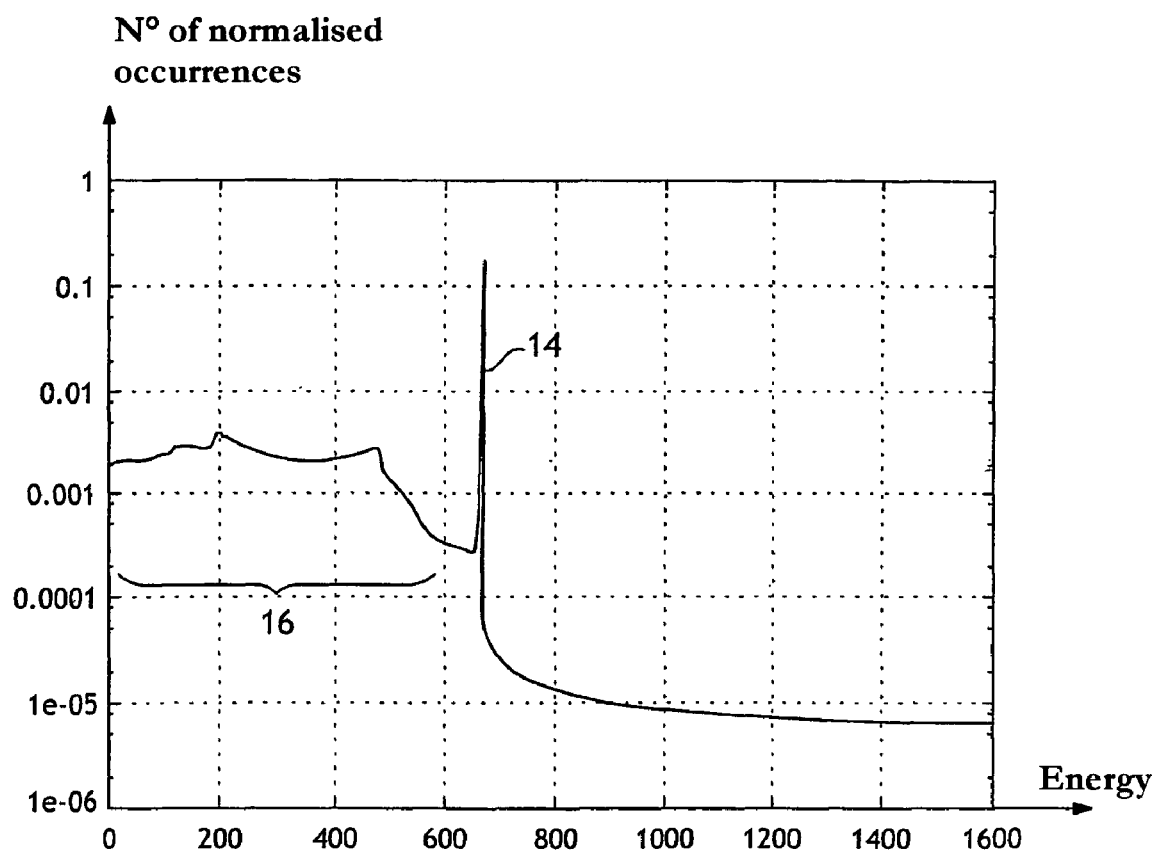
Figure 5:
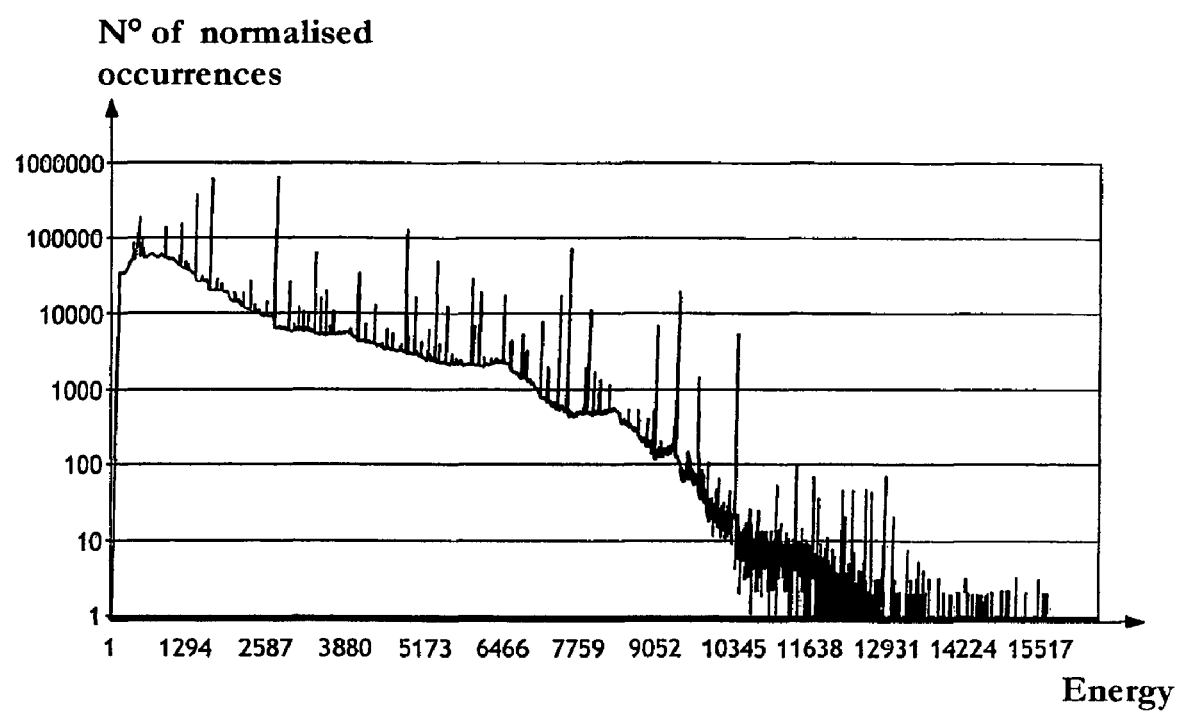

FIGS. 4 and 5 particularly illustrate these two disturbance phenomena.

FIG. 4 shows the energy distribution of the signal derived from a source emitting photons essentially at a single energy corresponding to peak 14.

It will be noted here that the signal from the detector is not in the ideal form of a single monoenergetic ray but also has a substantial continuous background 16 of lesser energy than peak 14 due to the Compton effect.

FIG. 5 illustrates the energy distribution of the signal derived from detection of a gamma source emitting photons at several energies, as is the case in FIG. 2.

The presence can again be noted of a noise ceiling due in particular to the above-mentioned phenomena: Compton effect and measurement noise.

This noise ceiling decreases substantially as and when the energies increase along the abscissa.

With respect to this figure, it is obvious that the identification of the radionuclides present in the analysed gamma source also proves to be difficult, the measured spectrum having a shape far removed from an ideally obtained shape.

Pulse Pileups

Another source or disturbance for spectrometry analysis of a gamma source concerns the problem of pulse pileup.

When a single photon enters into interaction with a detector, the generated pulse is of short but non-zero duration.

For example, with fast detectors, this duration is just under one microsecond.

It is then possible that, when two photons are emitted at close instants, the respective pulses generated by slow detectors are partly or even fully superimposed.

This phenomenon is particularly known when using a type 2 counter detector.

With these counters, each arriving pulse, while another pulse is in the progress of being detected, accordingly lengthens the pulse that is being formed.

Figure 6:
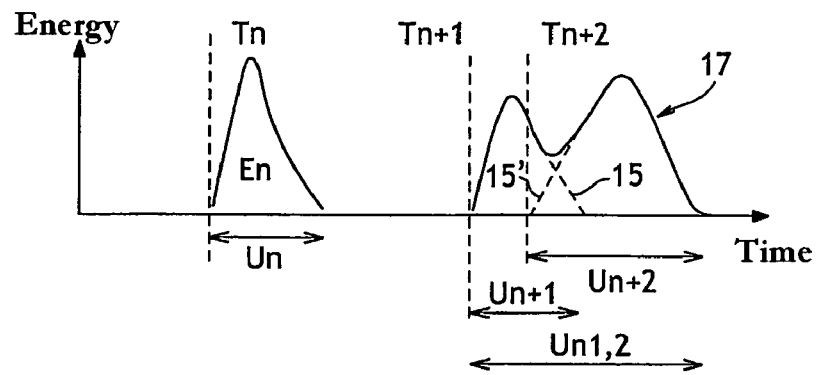

An illustration of this phenomenon is shown FIG. 6.

It shows a time signal containing a superimposition of two pulses 15, 15' arriving at times Tn+1 and Tn+2 and of duration Un+1 and Un+2 respectively.

Pulse 15' arrives even though pulse 15 is not completed.

It can be seen that the detector, which here has slow response with respect to pulse durations, cannot distinguish between the two pulses.

Indeed it merges the two pulses 15 and 15' to form only one main pulse 17 of duration Un1, 2, which leads to believing that only a single photon has entered into interaction with the detector.

For reasons of clarity in the remainder of this disclosure, an elementary pulse will mean a pulse related to a single photon (e.g. elementary pulse 15 or 15').

And a main pulse will correspond to a pulse possibly containing a pileup of elementary pulses.

One first consequence of the pileup phenomenon is therefore the risk of under-estimating the global activity of the gamma source during analysis.

It will be noted here that this phenomenon is all the more frequent the stronger the global activity of the source, or the slower the response of the detector.

In the remainder of this description it will be considered that the terms "global activity" and "count rate" are identical.

A second consequence of said pileup of photons concerns the actual estimation of energies.

With said detector, the sum of the energy of the piled up photons is allocated to a single photon, since by its very definition the main pulse 17 has a much larger area than elementary pulses 15 and 15'.

Therefore, as a general rule, the pileup phenomenon generates the wrong displacement of part of the spectrum towards increasing energies.

Figure 7:
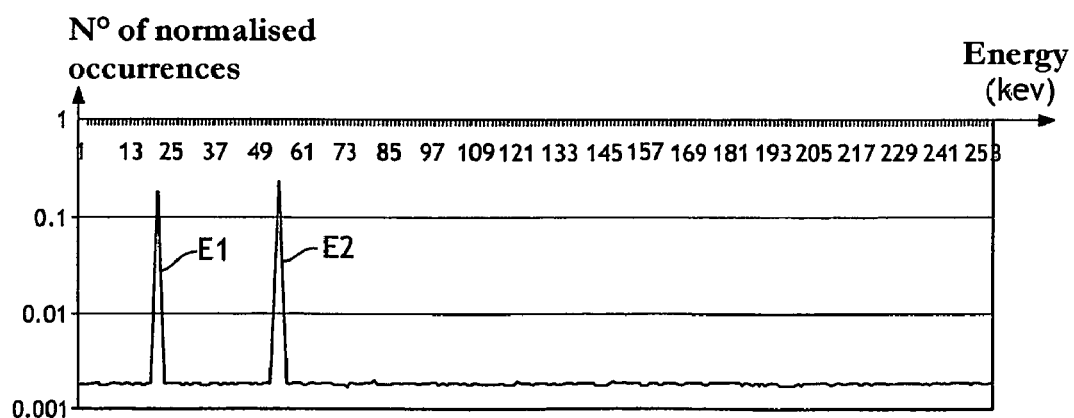
Figure 8:
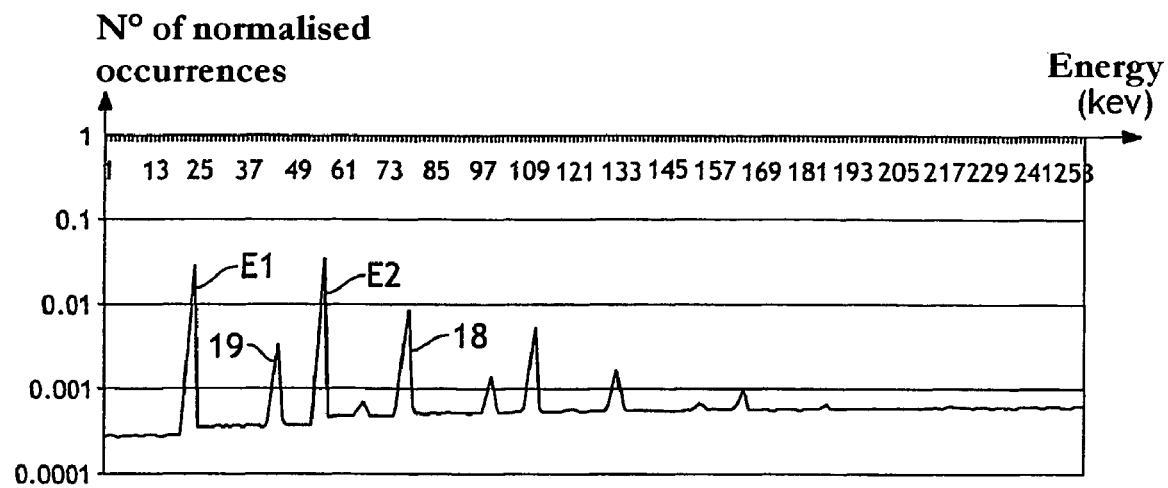

By way of illustration, said displacement can be seen FIGS. 7 and 8 which respectively show a normalised spectrum containing two main rays at 22 keV and 55 keV, no pileup phenomenon having occurred, and a normalised spectrum derived from one same gamma source in which there is a pileup phenomenon.

It will be noted that the analysed gamma source initially emits photons at two energies E1 and E2 clearly identified in FIG. 7.

This case corresponds to spectrometry analysis with a low count rate (a small detector positioned far from the source for example).

Conversely, when the count rate increases, the pileup phenomenon occurs and parasitic rays are seen to be created progressively at energies corresponding to linear combinations of energies E1 and E2 (e.g. 2E1, E1+E2, 2E2, 2E1+2E2, etc; e.g. rays 18 and 19).

In addition, the onset of these parasitic rays causes distortion of the apparent activity at energies E1 and E2 due to the dispersion of the signal towards high energies.

It will easily be understood that these parasitic rays risk disturbing the identification process of the radionuclides of the observed gamma source, and may even make results false since some rays do not correspond to any energy emitted by the source, the activity of the rays actually emitted being undervalued.

Numerous solutions have been put forward to limit all the above-described problems, in particular pileup-related problems.

A method [1] is known for example used in a spectrometer comprising a linear filtering operation in particular.

The purpose of the proposed filtering is to eliminate as much as possible the noise added to the effective signal, on the understanding that any main pulse formed of a pileup of elementary pulses is part of said noise.

Although this method brought some improvements, it leads to a compromise specific to it and which limits its field of use.

On account of the type of noise present in said signal, the proposed filtering is more efficient the more it operates over a long time period, which inevitably increases the risk that pileup phenomena may be taken into account.

Consequently this method is highly dependent upon the activity of the analysed gamma source.

If this activity is low, and the risk of pileup is therefore reduced, efficient filtering can be implemented.

On the hand, if this activity exceeds a certain threshold, said time over which filtering is implemented must be shortened to limit the number of pileups in the signal to be processed, which reduces the efficacy of noise elimination and hence reduces the resolution of the spectrum finally obtained.

Consequently, spectrometers using said method suffer from deteriorated resolution when the count rate of the gamma source increases.

Numerous manufacturers such as CAMBERRA/EURISYS, ORTEC or XIA have also developed digital spectrometers able to overcome pileup problems.

However the methods for processing pulses, in their conception, remain close to conventional methods which are still based on non-recursive linear filtering of FIR type (Finite Impulse Response) as proposed by the above method.

Such is the case with the "Digital Gamma Finder" spectrometer manufactured by XIA.

In this respect, details will be found in references [2], [3], [4] regarding XIA and in references [5] and [6] regarding CAMBERRA/EURISYS.

Other methods exist which partly solve the pileup problem.

They are based on analysis of the shape of the detected signal [7] or on a comparison of accumulated energy with a determined threshold [8], [9].

Yet these methods depend strongly on the type of detector used and remain scarcely robust when count rates are high.

Another recent method [10] is also known with which it is possible to correct distortions brought by specific detectors (in particular a detector containing Tellurium or Cadmium) which do not generate pulses whose area is proportional to the energy deposited by a photon. The energy deposited by the photon is estimated using two variables: the area and the rise time of the pulse associated with said photon.

However, like all the spectrometry methods presented above, this method is solely based on experimental results.

Also, these methods are generally restrict themselves to eliminating detected pulse pileups from the processed signal.

The final signal may be free of pulse pileup but some elementary pulses and the data they represent disappear with said elimination.

Therefore, one drawback of the these methods is that they do not enable identification of all the elementary pulses contained in a main pulse to analyse the data they represent.

One purpose of the present invention is therefore to overcome this shortcoming.

To meet this purpose it proposes an efficient identification method, in particular in the area of gamma radioactivity, based not on an experimental approach but on a rigorous approach.

Therefore the present invention proposes a measurement method comprising the processing of a signal containing a succession of main pulses of duration D and energy E, spaced in time from each and each possibly consisting of a pileup of elementary pulses of duration Di and whose energy is evaluated using a variable Ei having an additive property, said elementary pulses having times of arrival Ti which follow a homogeneous Poisson process of intensity λ, characterized in that it comprises the steps consisting of:

digitizing said signal to obtain data representing this signal, using this data:

measuring the duration D and energy E of each main pulse to construct Duration-Energy pairs (D,E), determining energy pairs (Di,Ei) of the elementary pulses from the constructed (D,E) pairs, deducing from the determined pairs (Di,Ei) the energy Ei of each elementary pulse.

Some preferred but non-limiting aspects of this method are the following:

the step to determine Duration-Energy pairs (Di,Ei) is implemented by solving an unpiling formula relating a function of the Duration-Energy pairs (D,E) of the main pulses with a function of the Duration-Energy pairs (Di, Ei) of the elementary pulses, said formula relates a discrete probability law for the Duration-Energy pairs (D,E) of the main pulses with a discrete probability law for the Duration-Energy pairs (Di, EI) of the elementary pulses, in the step to determine Duration-Energy pairs (Di,Ei) the discrete probability law of the Duration-Energy pairs (D,E) is estimated using constructed Duration-Energy pairs (D,E) and a number of occurrences associated with each said pair (D,E), said occurrences having been previously determined from said measurements, said formula is also dependent on the intensity λ of the Poisson process, said formula is of the form:

$$\sum_{t=0}^{\infty} z^t (\alpha^{t-Kt(s)}) = \frac{1}{1-(\alpha z + (1-\alpha)zB(z,s))}$$

in which the variables z and s represent Z-transforms of the durations and energies, t is a duration, B(z,s) the Z-transform of probability density t $b_{t,e}$, $b_{t,e}$ representing the probability that the duration of a main pulse is equal to a value t and its energy is equal to a value e, Kt(s) is the Z-transform of a function dependent probability density $h_{t,e}$ $h_{t,e}$ representing the probability that the duration of an elementary pulse is equal to a value t and its energy is equal to a value e, and α is a parameter dependent upon the activity of the analysed source, the intensity λ of the Poisson process is determined by measuring the time intervals between main pulses, parameter α is determined using the following formula:

$$\alpha = \exp(-\lambda T_e)$$

in which Te is a sampling period associated with the digitizing step, the step to deduce the energy Ei of each elementary pulse comprises a step to determine a discrete probability law of its energies, the discrete probability law of energies is a marginal probability law, according to energy, of the discrete probability law of the Duration-Energy pairs (Di, Ei), according to duration, a power series is developed of the fraction on the right of the equation in said unpiling formula to determine the coefficients of this series, the coefficients of said power series are identified with the $\alpha^{t-Kt(s)}$ coefficients contained in the term on the left side of the equation in said unpiling formula, to determine said probability $h_{t,e}$ related to the DurationEnergy pairs (Di,Ei) of the elementary pulses, said determination of the coefficients of the power series and said identification step of the coefficients each comprise at least one discrete convolution calculation, said coefficient identification step also comprises a positivity constraint test, the main pulses represent main flows each possibly containing a pileup of elementary flows, each elementary flow being represented by an elementary pulse, the flows are flows of photons the photons are gamma photons an energy of each flow of photons is represented by the energy of the corresponding pulse, and each energy is determined from the area under each corresponding pulse, the method comprises an initial measurement step of said signal comprising a succession of main pulses representing physical phenomena, the method comprises at least one step consisting of providing a user with data on said signal, said data concerns the elementary flows, said data concerns the energy Ei of the elementary pulses representing elementary flows.

Another purpose of the present invention is to propose a device for analysing a signal containing a succession of main pulses of duration D and energy E, spaced in time from each other and possibly consisting of a pileup of elementary pulses of duration Di and energy Ei, said elementary pulses having arrival times Ti which follow a homogenous Poisson process of intensity λ, characterized in that said device comprises means able to apply the method according to the above-preferred aspects either alone or in combination.

Figure 9:
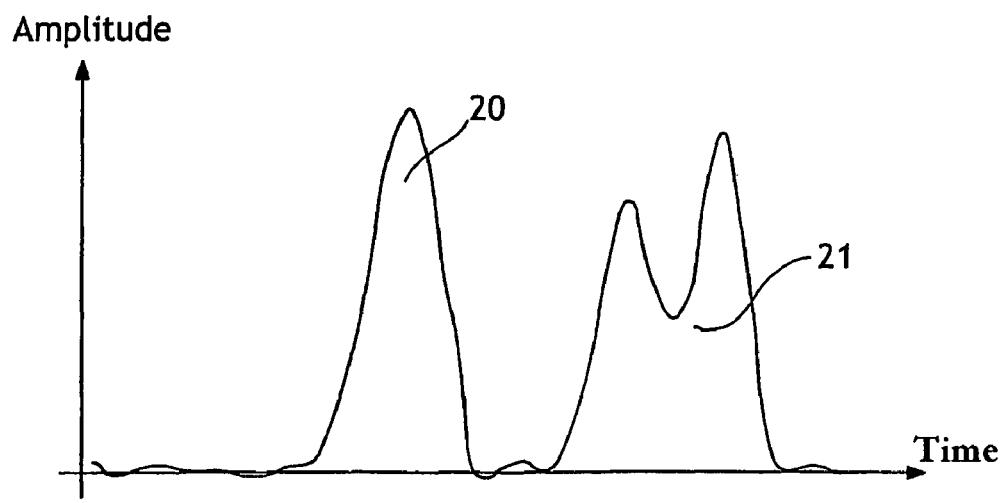
Figure 10:
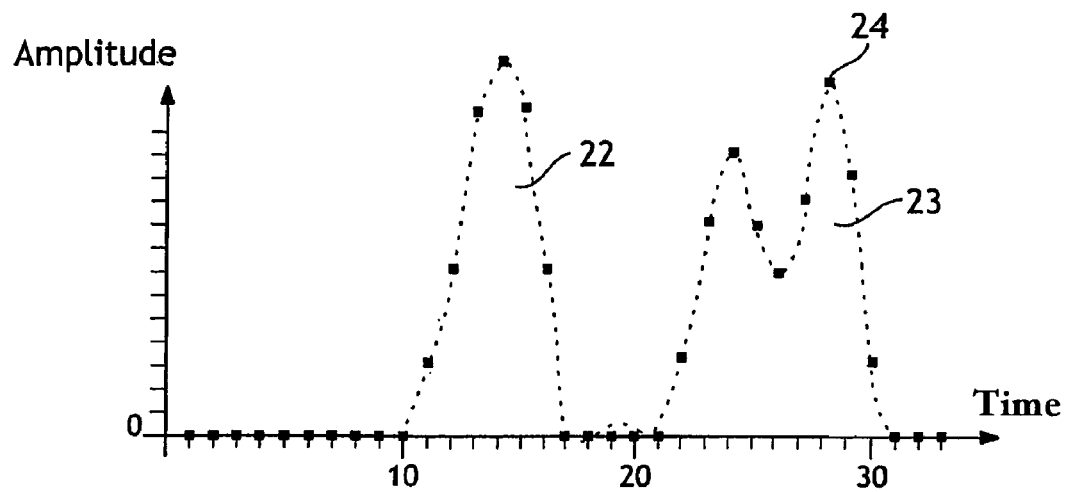
Figure 11:
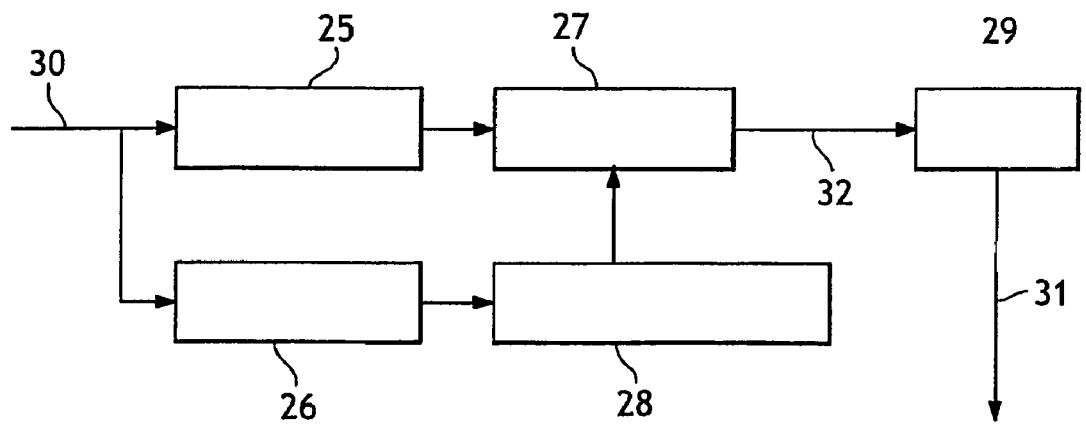
Figure 12:
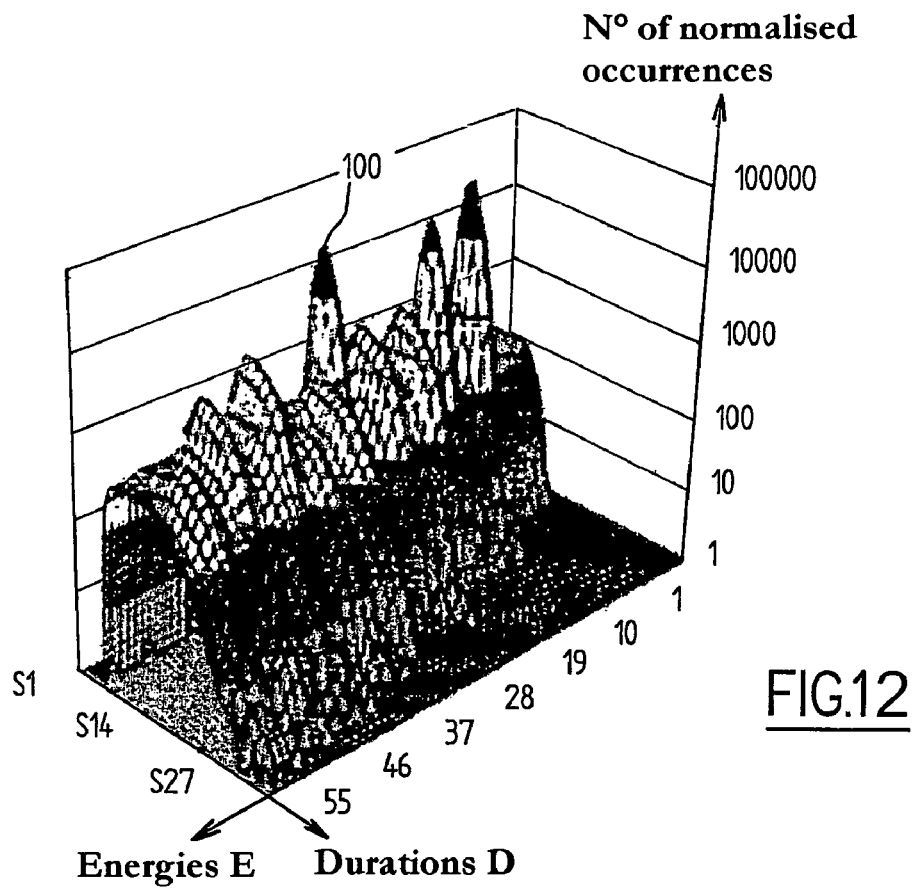
Figure 13:
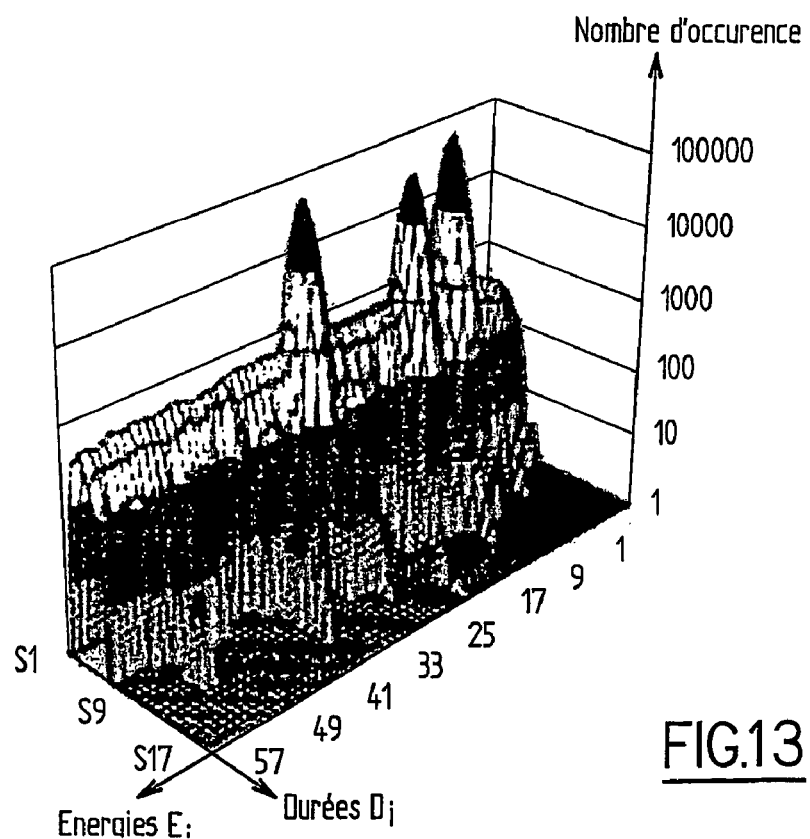
Figure 14:
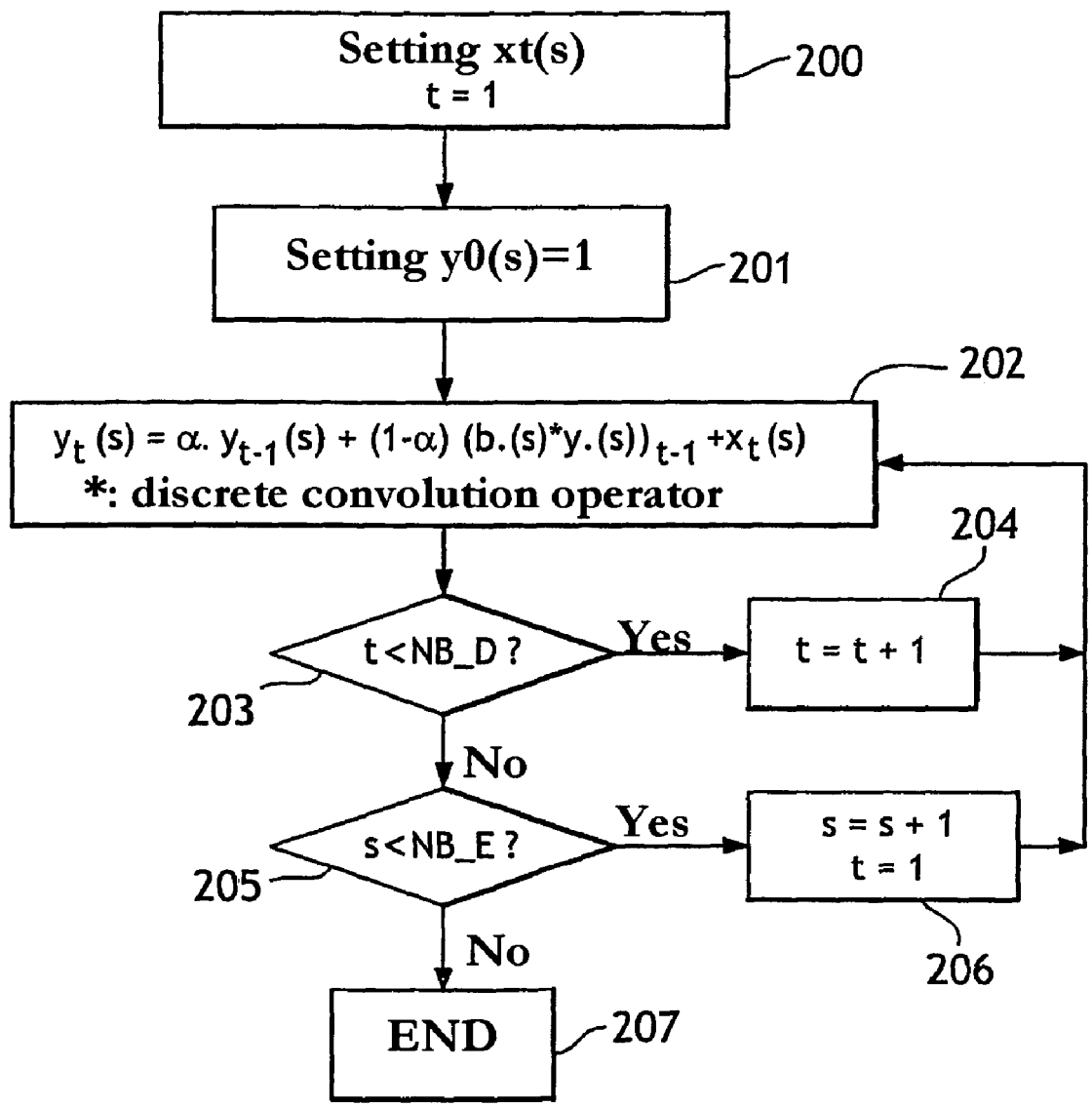
Figure 15:
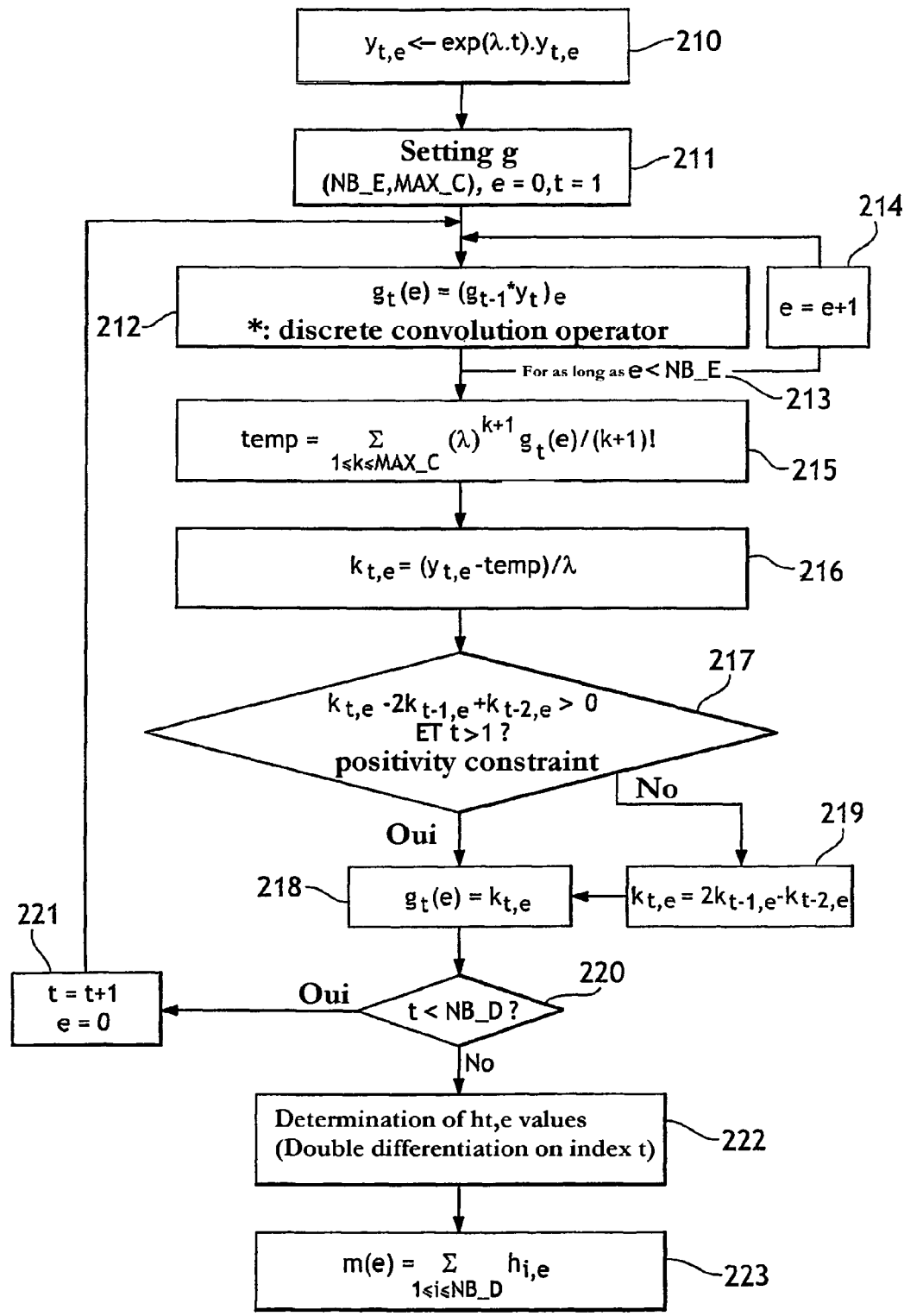
Figure 16:
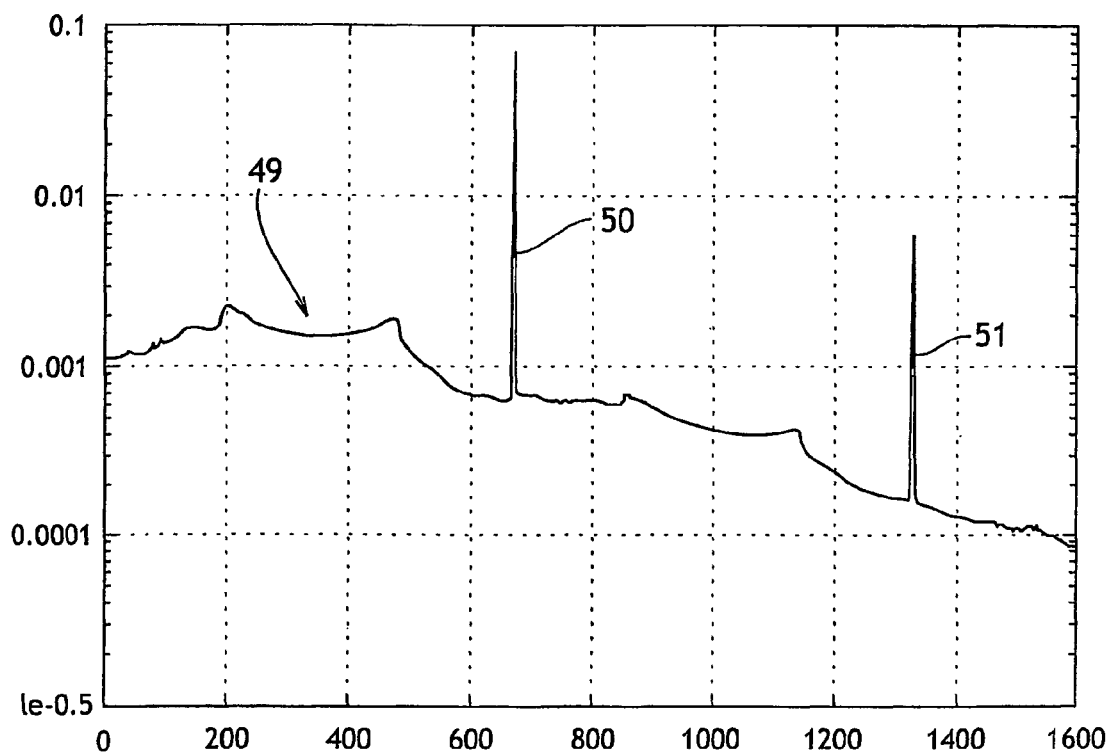
Figure 17:
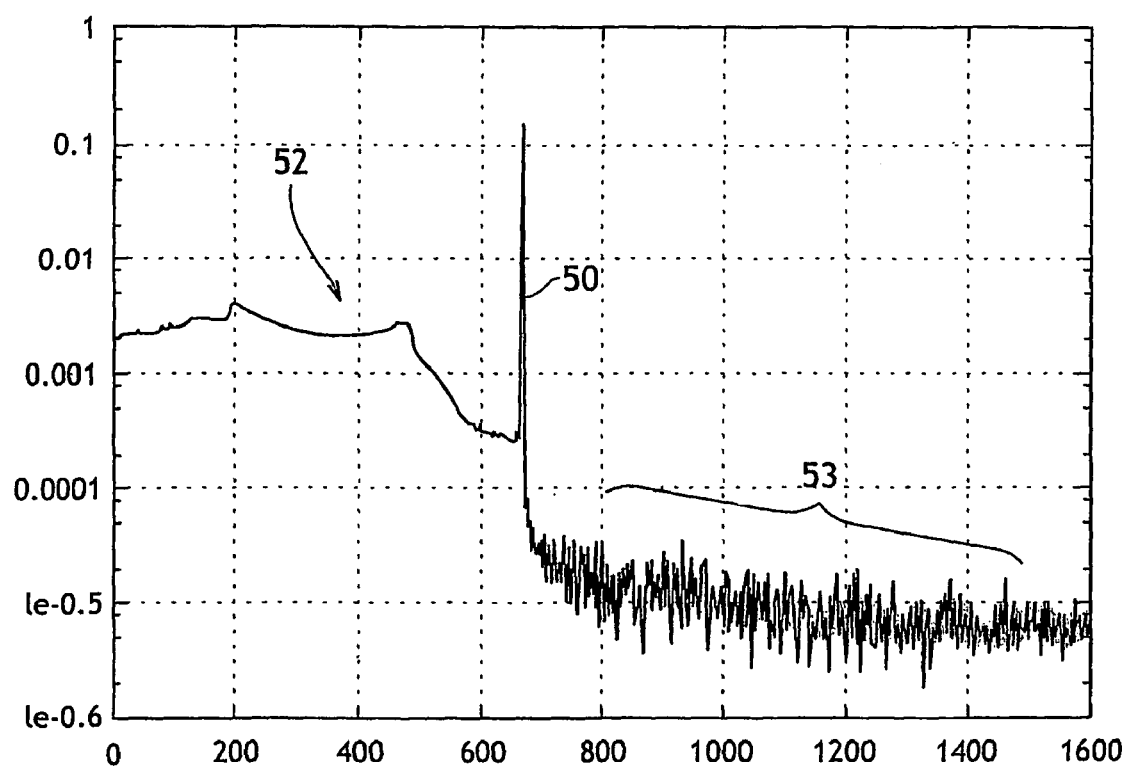

Other aspects, purposes and advantages of the present invention will become better apparent on reading the following detailed description of one preferred embodiment, given by way of example and non-limiting, with reference to the appended drawings in which:

FIG. 1 is a schematic of the elements of a digital acquisition chain in gamma spectrometry, FIG. 2 illustrates a ray spectrum of a gamma source which can be observed using a device as in FIG. 1, FIG. 3 is an illustrative example of a time signal generated by a gamma photon detector, FIG. 4 is an illustrative example of the measured energy distribution of a monoenergetic Caesium 137 source, FIG. 5 is an illustrative example of an energy distribution of an activity source emitting photons at several energies, FIG. 6 schematically illustrates a time signal derived from a slow detector when a pileup phenomenon occurs, FIG. 7 illustrates a normalised spectrum of a gamma source when no pilup phenomenon occurs, FIG. 8 illustrates a normalised spectrum of the gamma source analysed in FIG. 7 when a pilup phenomenon occurs through increased activity, FIG. 9 is a schematic of a signal portion measured by the inventive system, this signal comprising two main pulses, FIG. 10, as an illustration, shows the signal in FIG. 9 when it is digitized by the inventive method, FIG. 11 is a block diagram of the inventive method, FIG. 12 gives an example of a two-dimensional histogram of the D-E pair of the occupation sequences of a signal processed by the method, FIG. 13 gives an example of a two-dimensional histogram of the Di and Ei pair of elementary pulses of said processed signal, FIG. 14 is a block diagram of an algorithm used to implement a first part of the unpiling method according to the invention in a suitable electronic device, FIG. 15 is a block diagram of an algorithm used to implement a second part of the unpiling method according to the invention in a suitable electronic device, FIG. 16 shows an observed gamma energy spectrum of Caesium 137, the inventive method not being applied, FIG. 17 shows an observed gamma energy spectrum of Caesium 137 using the method of the invention.

As a preliminary, in the remainder hereof an occupation sequence will be designated as an uninterrupted signal portion during which at least one elementary pulse is always present, i.e. at every instant the amplitude of this signal is greater than a threshold corresponding for example to the white noise level of the detector.

In fact an occupation sequence corresponds to a main pulse.

However with this new notion it is possible, to subsequent great advantage, to designate a non-occupation sequence as an uninterrupted signal portion during which this signal is lower than or even equal to the chosen threshold (the threshold again possibly being the noise level of the detector).

By way of example, FIG. 9 schematically illustrates a signal portion measured by the inventive system, said signal containing two occupation sequences 20 and 21.

Occupation sequence 20 does not contain a pileup, whilst sequence 21 contains a pileup of two elementary pulses.

Also, attention is drawn to the fact that by pulse duration D or Di is meant a time corresponding to the total width of said pulse.

In this respect, in the remainder of this disclosure, durations and energies will be designated as follows in the formulas:
 durations: t for a time formula, or z when the formula has been Z-transformed,
 energies: e for a time formula, or s when the formula has been Z-transformed.

With reference now to FIG. 10, the inventive system samples and digitizes the whole signal generated by the detector during a measurement step to obtain a flow of digital data 24 representing this signal or more generally the associated flow of gamma photons.

It will be noted that said sampling uses the sampling period Te whose value is set at 1 in this disclosure to simplify the writing of formulas and their comprehension.

This flow of digital data is processed by the processing block in FIG. 1.

Typically, a circuit is used able to perform operations on digital data such as a processor, a Digital Signal Processing (DSP) circuit, a FliFlop Programmable Gate Array (FPGA) or any other equivalent circuit.

In this processing block, the inventive method is implemented to unpile the pulses contained in the measured signal.

By "unpiling" is meant any processing of the data contained in the main pulses in order to partly or fully solve the problems arising out of pileups of elementary pulses.

The proposed unpiling method is based on the following hypotheses:
 the elementary pulses have times of arrival which follow a homogenous Poisson process of intensity $\lambda$,
 the variables representing energies have additive properties.

A block diagram of the method is shown FIG. 11.

First consideration is given to the digital data representing occupation sequences.

In particular their duration D is estimated and their energy E, and a group 30 of Duration-Energy (D,E) pairs is constructed each associated with a particular occupation sequence.

It will be noted that the energy E of an occupation sequence is evaluated using the area under this sequence.

This area is calculated from amplitudes of the digitized data and from the time resolution obtained, this resolution depending in particular on the performance level of the acquisition block in FIG. 1.

Evidently the accuracy of area estimation increases with time resolution, hence with an over-sampling factor.

A first series of steps (26, 28) then consists of determining said intensity $\lambda$ of the Poisson process (this parameter $\lambda$ will be necessary at block 27 level).

For this purpose, the time intervals are calculated between each occupation sequence using pairs (D,E) of the occupation sequences (block 26) and arrival times of these occupation sequences.

Then said intensity $\lambda$ is estimated using the time intervals separating the occupation sequences (block 28).

This estimation is possible since the applicant has determined that these times follow an exponential probability law of parameter $\lambda$.

This parameter can therefore be estimated by characterizing the exponential law using the time intervals which can be estimated from durations D and times of occurrence of the measured main pulses.

Block 25 consists of calculating a number of occurrences per pair (D,E) to obtain information on the relative presence of the occupation sequences.

By way of illustration, it is possible to obtain 10 pairs (0.4 ms, 1 Mev), 2 pairs (0.4 ms, 1.2 Mev) and 40 pairs (1 ms, 1 Mev).

When in possession of a table of data containing the number of occurrences per pair (D,E), it is then possible to obtain an estimator of statistical distribution.

One possible representation of said distribution is illustrated FIG. 12.

This figure shows a two-dimensional histogram of the D and E pair of the occupation sequences in the processed signal.

Evidently this histogram is given solely for illustrative purposes and is in no way limiting.

In this figure a peak 100 can be clearly seen which corresponds to the occupation sequence whose duration index is 14 and energy index is 28.

According to measurements made, this occupation sequence occurred approximately 10000 times in the signal derived from the detector.

Therefore, in a certain manner, block 25 consists of constructing a table of data representing a two-dimensional histogram of durations and energies.

Another block 27 then consists of linking (D,E) pairs with Duration-Energy pairs (Di,Ei) of elementary pulses.

By so doing and for the first time, information can be obtained on the elementary pulses contained in the signal derived from the detector.

More precisely, the change from main pulses to elementary pulses is performed using a formula which links a discrete probability law for the pairs (D,E) of the main pulses with a discrete probability law for the pair (Di,Ei) of elementary pulses.

Said formula, which will be called an unpiling formula, is given below:

$$\sum_{t=0}^{\infty} z^t (\alpha^{t-Kt(s)}) = \frac{1}{1-(\alpha z+(1-\alpha)zB(z,s))} \quad (1)$$

t represents a duration and variables z and s represent Z-transforms of durations t and energies e $B(z,s)$ is the Z-transform of the probability density $b_{t,e}$ the duration of the main pulse being equal to a value represented by the duration index t and its energy being equal to the value represented by index e (t and e are integers).

An equation of $B(z,s)$ has the following form:

$$B(z,s) = \sum_{t\geq 1}\sum_{e\geq 1} b_{t,e} z^i s^e \quad (2)$$

$Kt(s)$ is a function depending on the probability density $h_{t,e}$, the duration of an elementary pulse being equal to a value represented by the duration index t and its energy being equal to a value represented by index e.

This function is expressed in the form:

$$Kt(s) = \sum_{e=1}^{\infty} k_{t,e} s^e = \sum_{e=1}^{\infty}\left(s^e \sum_{j=1}^{t-1}\sum_{k=1}^{j} h_{k,e}\right) \quad (3)$$

Finally, parameter α is related to the activity of the analysed source and depends in particular on said intensity λ of the Poisson process.

The advantage of having determined this parameter λ with blocks 26 and 28 will now be understood.

Regarding said parameter α, its determination in relation to parameter λ can be made using formula (4):

$$\alpha = \exp(-\lambda Te) \quad (4)$$

in which Te is a period of the signal which samples the signal derived from the detector.

When block 27 is completed, a table of data 32 is obtained relating to pairs (Di,Ei) of the elementary pulses contained in the signal.

In other words, at this level we are capable of constructing a new two-dimensional histogram of the durations and energies of said elementary pulses.

A non-limiting example of said histogram is given FIG. 13.

By comparison with FIG. 12, it can be seen that the durations of the pulses are reduced.

The main pulses containing pileups of elementary pulses have indeed given way to said elementary pulses.

Block 29 uses a calculation of the marginal probability law, according to energies, of the discrete probability law for pairs (Di,Ei).

In this way each energy Ei is calculated, using pairs (Di,Ei), by summing the durations associated with the chosen energy Ei.

As an illustrative example, it is assumed that block 27 allowed determination of the pairs (Di,Ei) 32 given in the following table:

|  | Energy Ei | | | |
|---|---|---|---|---|
|  | 1 Mev | 1 Mev | 1 Mev | 1 Mev |
| Duration Di | 0.1 ms | 0.2 ms | 0.3 ms | 0.35 ms |
| Probability | 0.1 | 0.25 | 0.2 | 0.17 |

The probability that a pulse, all durations taken together, has an energy Ei of 1 Mev in the signal is 0.72 (0.1+0.25+0.2+0.17).

Expressed in equation form, said determination of the occurrence of an energy e, denoted Ge hereunder, is the following:

$$G_e = \sum_{k=1}^{NB\_D} h_{k,e} \quad (5)$$

in which k is the index of durations and NB_D the number of duration channels.

The method proposed by the present invention requires the implementation of the various above formulas in a suitable device, so as finally to obtain data 31 on the spectrum of the energies Ei of the elementary pulses contained in the signal.

AS mentioned previously, said device may be a DSP circuit, FPGA circuit, ASIC circuit (Application Specific Integrated Circuit) or any other equivalent circuit.

A judicious choice must be made in relation to the constraints connected with the intended application, such as cost, size, performance level, modularity, etc.

In all cases, said implementation comprises two essential steps in particular which will now be explained.

Evidently, persons skilled in the art, on reading the description given below, will know that other possible variants exist and that the proposed implementation is in no way limiting.

According to formula (1) it will be recognized that the expression on the left of the equation is in the form of a power series whose coefficients correspond to the term between brackets, i.e. $\alpha^{t-Kt(s)}$ Having regard to this property of interest, one first step of the proposed implementation consists of developing the term on the right of the equation in a power series, and of determining all the coefficients of this series.

In other words, the coefficients $y_t(s)$ are sought in the following formula:

$$\frac{1}{1-(\alpha z+(1-\alpha)zB(z,s))} = \sum_{t\geq 0} z^t y_t(s) \quad (6)$$

in which t is an integer corresponding to a duration.

Step One: Searching the Coefficients of a Power Series

Said step uses an algorithm based on a recurrence relationship.

For this purpose, said term on the right of equation (1) is considered to be a pulse response of an Infinite Impulse Response (IIR) filter whose coefficients $y_t(s)$ are determined according to energies.

The Z-transform of the Y/X transfer function of said filter makes it possible to use said term on the right of the equation, to write:

$$X(z,s) = Y(z,s)(1-(\alpha z+(1-\alpha)zB(z,s))) \quad (7)$$

i.e.:

$$X(z,s) = Y(z,s) - \alpha z Y(z,s) - (1-\alpha)zB(z,s)Y(z,s) \quad (8)$$

By calculating the reverse Z-transform of formula (8) solely according to durations z, the following is obtained:

$$x_t(s) = y_t(s) - \alpha y_{t-1}(s) - ((1-\alpha)b_t(s)*y(s))_{t-1} \quad (9)$$

i.e.

$$y_t(s) = \alpha y_{t-1}(s) + ((1-\alpha)b_t(s)*y(s))_{t-1} + x_t(s) \quad (10)$$

with:

$$b_t(s) := \sum_{e \geq 1} b_{t,e} s^e \quad (11)$$

It will be noted here that the sign * designates the convolution operator.

According to formula (10) the coefficients $y_t(s)$ can be determined recursively for a given energy s.

For this purpose, since we are interested in the pulse response of said filter, $x_t(s)$ is a two-dimensional Dirac, the coefficients $b_t(s)$ in formula (II) are known from the data on the histogram of the main pulses, and parameter α is known from formula (4).

A block diagram of an algorithm which can be implemented in a device such as mentioned above and based mainly on formula (10) is illustrated FIG. 14.

One first step 200 consists of setting certain variables including $x_t(s)$ which represents the filter input and which use the values of the Z-transform according to energies of a two-dimensional Dirac.

Also the duration t is set at 1.

In step 201, the filter output $y_t(s)$ is set.

More precisely, a first duration (t=0) is fixed and all values relating to energies of variable $y_0(s)$ are set at 1.

At this stage it is possible to start calculating $y_t(s)$ from equation (10).

To do so, two loops are used overlapping durations t and energies s.

The first loop on durations comprises steps 202, 203 and 204, the second loop on energies comprises steps 202 to 206.

At step 202, formula (10) is determined for a given energy s.

For example, when first passing through this step 202, it is $y_1(s=0)$ that is calculated, then after a first iteration in the loop of durations t, it is $y_2(0)$ which is determined.

Therefore, by means of this first loop all values $y_t(0)$ can be calculated.

Step 203 is a test used to determine whether the loop on the durations must continue.

This test consists of comparing the variable of durations t with a number of channels with a predefined maximum duration (denoted NB_D).

If the test is positive, step 204 is then implemented to increment the variable of durations t.

When applicable, the algorithm leaves said first loop and at step 205 tests whether the second loop must continue.

At step 205 therefore the variable s is compared with a number of channels with a predefined maximum energy (NB_E).

If the test is positive, the algorithm moves on to step 206 in which energy s is incremented and in which the duration variable t is set at 1 as in step 200.

The algorithm then again arrives at step 202 and all values $y_t(1)$ can now be determined.

By way of example the first coefficient calculated is $y_1(1)$ then, after the first incrementing of t, step 202 calculates $y_2(1)$ etc.

The algorithm finally ends at step 207 on leaving the second loop on energies.

Finally a matrix is obtained on the durations and energies whose elements are the sought coefficients $y_t(s)$ of the pulse response of the IIR filter, or in other words the desired coefficients of said power series in formula (6).

A second step consists of identifying the coefficients thus determined with the coefficients of the power series on the left of the equation in the unpiling formula (1).

According to (1) and (6), it is possible to write:

$$\sum_{t \geq 0} z^t (\alpha^{t-Kt(s)}) = \sum_{t \geq 0} z^t y_t(s) \quad (11)$$

hence:

$$\alpha^{t-Kt(s)} = y_t(s) \quad (12)$$

By replacing activity α by (4) the following is obtained:

$$y_t(s) = \exp(-\lambda t)\exp(\lambda K_t(s)) \quad (13)$$

The power series of the exponential containing the term $\lambda k_t(s)$ is now developed:

$$y_t(s) = \exp(-\lambda t)\sum_{n \geq 0} \frac{(\lambda K_t(s))^n}{n!} \quad (14)$$

then, so that said formula can be implemented in the chosen device, a truncation of the power series is performed:

$$y_t(s) \approx \exp(-\lambda t)\sum_{n=0}^{MAX\_C} \frac{(\lambda K_t(s))^n}{n!} \quad (15)$$

Finally, by applying the reverse Z-transform according to energies to the second term of equation (15), the following formula is obtained:

$$y_{t,e} = \exp(-\lambda t)\sum_{n=0}^{MAX\_C} \frac{\lambda^n}{n!}(k_{t,e})^{(e)*n} \quad (16)$$

in which $k_{t,e}$ is the reverse Z-transform of $K_t(s)$ according to energies s.

It will be noted here that the denotation $^{(e)}*n$ used in formula (16) designates the n-th convolution according to energies e.

Knowing $y_{t,e}$, the coefficients $k_{t,e}$ are determined from formula (16), then the coefficients $h_{t,e}$ are deduced from equation (3) using a double differentiation, and finally a sum is performed on the durations according to energies of coefficients $h_{t,e}$ to determine each energy Ei of the elementary pulses contained in the signal.

A recursive algorithm will now be proposed which can be used to implement this second identification step in the chosen device.

Here again, those skilled in the art will recognize the numerous possible variants of the proposed embodiment.

The main steps of said algorithm are given by way of illustration in FIG. 15.

It is recalled here that these steps use calculations essentially based on formulas (16) and (3).

During the first step 210, the mathematical expression $y_{t,e}\text{-exp}(\lambda t)$ is determined to start determining the sum on index n in the term on the right of equation (16).

Therefore this expression derives from formula (16) when the exponential is moved to the left side of the equation.

The arrow shown in step 210 in FIG. 15 designates an allocation operation allocating a value to a variable, in this case $y_{t,e}$.

Then step 211 consists of setting the term $k_t^{*n}(s)$ contained in formula (16).

The values of this term are stored in a variable denoted $g_t(e)$ in FIG. 15.

It will be noted that $g_t(e)$ is the variable which stores the n-th convolutions according to energies $(k_{t,e})^{(e)*n}$ of coefficients $k_{t,e}$.

Other variables such as energy, duration, the number of channels with maximum duration NB_D and the number of channels with maximum energy NB_E are set.

Two overlapping loops are then used from step 212 onwards.

A first loop on energies comprises steps 212, 213 and 214.

It is used to determine the n-th convolutions or $(k_{t,e})^{(e)*n}$ of coefficients $k_{t,e}$ for a given duration t.

The second loop comprises steps 212 to 221.

It concerns durations t and is used to calculate the coefficients $k_{t,e}$ according to durations.

A more precise description is given below of each of these two loops.

As mentioned above, the first loop on energies starts at step 212.

During this step, the convolution of $y_t(e)$ is calculated according to energies with $g_{t-1}(e)$ and this value is stored in $g_t(e)$.

A test on the index of energies is then conducted at step 213 to detect a possible exit from this first loop on energies.

For as long as the energy is progress is less than NB_E, this energy is incremented at step 214 and step 212 is recommenced.

Once the n-th convolutions $(k_{t,e})^{(e)*n}$ are determined according to energies for duration t in progress, step 215 can be started which calculates then stores in a variable denoted temp part of the sum on the right side of the equation in formula (16).

More precisely, the temp variable assumes the following values:

$$temp = \sum_{k=1}^{MAX\_C} \lambda^{k+1} g_t(e) \quad (17)$$

where t is the duration in progress in the second loop and MAX_C is the truncation index for the development of the exponential in a power series.

This temp variable is then used at step 216 to calculate all coefficients $k_{t,e}$ according to energies and for duration t in progress.

The calculation of said coefficients $k_{t,e}$ is the following:

$$k_{t,e} = (y_{t,e} - \text{temp})/\lambda \quad (18)$$

They are calculated by the difference between said sum of formula (16) and said part of the sum of the same formula.

This amounts to calculating the following expression:

$$k_{t,e} = \frac{1}{\lambda}\left( \sum_{n=1}^{MAX\_C} \frac{\lambda^n}{n!}(k_{t,e})^{(e)*n} - \sum_{n=1}^{MAX\_C-1} \frac{\lambda^{n+1}}{(n+1)!}(k_{t,e})^{(e)*n+1} \right) \quad (19)$$

Once the coefficients $k_{t,e}$ according to energies and for a given duration t are determined, a positivity constraint test is conducted at step 217 to guarantee that the value obtained is coherent with a probability density.

The test consists of determining whether or not the following inequations are verified:

$$k_{t,e} - 2k_{t-1,e} + k_{t-2,e} > 0? \quad (20)$$

and if t>1?

In a certain manner it is determined whether at the preceding duration t-1 the double digital derivative is positive.

If not, the algorithm moves on to step 219 which fixes the coefficients $h_{t,e}$ corresponding to zero value.

Then, at step 218, these determined coefficients $k_{t,e}$ are stored in the variable $g_t(e)$.

On the other hand, if test 217 is positive, step 219 is ignored to accede step 218 directly.

At step 220, the test of the second loop on durations determines whether the calculations according to durations of coefficients $k_{t,e}$ [or $g_t(e)$] are completed.

If not, step 221 is conducted in which the duration is incremented and the index for energies is reset at zero.

It is then returned to the start of step 212 with this new duration.

On the contrary if the calculations are completed, the second loop on durations can be left.

The coefficients $k_{t,e}$ according to energies and durations are now determined.

As mentioned above, the coefficients $h_{t,e}$ are now deduced from formula (3).

This double differentiation operation is implemented at step 222.

At the end of this step, all the coefficients $h_{t,e}$ have been obtained representing the probability density of the duration/energy pairs of the elementary pulses contained in the processed signal.

A last step 223 determines the energies of the elementary pulses and stores the same in a variable m according to energies.

To achieve this purpose, the coefficients $h_{t,e}$ are added according to durations, for each energy.

It will be noted that this step corresponds to the calculation of said marginal probability according to the energies of the discreet probability density of the duration/energy pairs of the elementary pulses.

The energies of the elementary pulses stored in memory are finally supplied to the user by read-out means so that the user can identify the radionuclides present and make a diagnosis (printer, monitor or any other device of equivalent function).

Those skilled in the art will find a certain number of obvious variants.

By way of example, the data provided by the method may relate to intermediate steps (graphic representation of histograms of the Duration-Energy pairs of main pulses or elementary pulses, etc. . . . ).

Some non-limiting results are given below which were obtained when implementing the inventive method using the above-described algorithms.

FIG. 16 shows a gamma energy spectrum observed with Caesium 137.

The spectrometry device is such that pileups occur.

In addition, this device does not yet use the unpiling method of the invention.

It will be seen that this spectrum contains a fundamental ray 50 at energy E3, and a second ray 51 at energy E4 corresponding to a pileup of two photons of energy E3.

FIG. 17 shows a spectrum 52 of the same gamma source (Caesium 137) when the inventive method is used in said device.

Ray 51 of energy E4 has disappeared; only the ray corresponding to energy E3 remains in the spectrum so that this spectrum conforms to the spectrum of Caesium 137.

In addition, it will noticed in FIG. 17 that the noise ceiling 53 is greatly reduced with respect to the one seen in FIG. 16.

For information, this ceiling is due in particular to a combination of pileups and Compton effects.

The results obtained are therefore very satisfactory.

They reveal the efficacy of the inventive measurement method and its industrial applicability by implementing the proposed algorithms in suitable electronic devices.

More generally, the present invention offers numerous other advantages:

improved identification of emitted energies, and their occurrence, unlike filtering methods via elimination mentioned in the introduction, the entire measured signal is taken into account without eliminating any effective part of this signal, no need for any hypotheses regarding pulse shape, good reliability of the method irrespective of source activity, whether low or high (however one condition necessary for proper functioning of the method is that there must not be any permanent pileup of elementary pulses), possible direction application of the method to the measured signal, or later application, use of very few approximations rendering the method digitally more accurate than prior art methods.

Evidently the present invention is in no way limited to the embodiment described above and illustrated in the drawings.

In particular, the present invention can be applied to other spectrometry areas (e.g. alpha, neutron spectrometry and more generally any type of corpuscle) and on different types of detectors, in particular of different sizes and forms.

And more generally it can be used for applications in which it is sought to determine the contribution of elementary signals contained in a main signal, per pileup, each signal possibly representing a flow in the general meaning of the word.

Without being limiting, this may be a flow of photons, of fluorescent elements or of elements in a queue in a communications system, etc.

For example, with respect to queues, as a possible equivalent of the embodiment described in the present invention, it is possible to associate a connection time with the duration variable D and a passband with the energy variable E.

Also, it is in no way compulsory for an energy E to be evaluated by estimating the area under a pulse.

In the embodiment described in the present inventing, determination using area is fully suitable since a simple relationship relates this area to the energy of a gamma photon.

However, this is not necessarily the case in different applications.

Persons skilled in the art will understand here that one of the concepts of the present invention, as a general rule, is based on the use of an energy to represent the weight of an elementary pulse in a main pulse.

The method for estimating this weight may therefore prove to be very different according to application.

By way of example, but non-limiting, a weight could correspond to an amplitude of an elementary pulse, a specific duration, etc.

It is recalled here that solely the following constraints are to be observed in order to apply the inventive method:

the arrival times of elementary pulses follow a homogeneous Poisson process, the main pulses have a determined duration D, the variables Ei representing the energies of elementary pulses have additive properties.

The invention claimed is:

1. Measurement method comprising the processing of a signal (11) containing a succession of main pulses (17) of duration D and energy E, spaced in time from each other and each consisting of a pile-up of elementary pulses (15) of duration Di and whose energy is evaluated by a variable Ei having an additive property, said elementary pulses (15) having times of arrival Ti which follow a homogeneous Poisson process of intensity $\lambda$, wherein the method comprises the steps of:

digitizing said signal to obtain data (24) representative thereof, from said data (24):

measuring the duration D and energy E of each main pulse (17) to construct Duration-Energy pairs (D,E), determining the energy pairs (Di,Ei) of the elementary pulses (15) from the constructed pairs (D,E), by solving an unpiling formula linking a function of the Duration-Energy pairs (D,E) of the main pulses with a function of the Duration-Energy pairs (Di,Ei) of the elementary pulses, said unpiling formula is of the form:

$$\sum_{t=0}^{\infty} z^t(a^{t-Kt(s)}) = \frac{1}{1 - (\alpha z + (1-\alpha)zB(z,s))}$$

in which the variables z and s represent Z-transforms of durations and energies respectively, t is an integer corresponding to a duration, B(z,s) is the Z-transform of probability density $b_{t,e}$, $b_{t,e}$ representing the probability that the duration of a main pulse is equal to the value t and its energy is equal to a value e, Kt(s) is the Z-transform of a function dependent upon the probability density $h_{t,e}$, $h_{t,e}$ representing the probability that the duration of an elementary pulse is equal to the value t and its energy is equal to the value e, and $\alpha$ is a parameter dependent on the activity of the analysed source, determined using the following formula:

$\alpha = \exp(-\lambda T_e)$ in which Te is a sampling period associated with the digitizing step.

2. Method as in claim 1, characterized in that said formula links a discreet probability law of the Duration-Energy pairs (D,E) of the main pulses, with a discrete probability law of the Duration-Energy pairs (Di,Ei) of the elementary pulses.

3. Method as in claim 2, characterized in that in the step to determine Duration-Energy pairs (Di,Ei), the discreet probability law of the Duration-Energy pairs (D,E) is estimated using constructed Duration-Energy pairs (D,E) and a number of occurrences associated with each said pair (D,E), said occurrences having been determined previously from said measurements.

4. Method as in any of claims 1, 2, or 3, characterized in that said formula is also dependent on the intensity λ of the Poisson process.

5. Method as in claim 1, characterized in that the intensity λ of the Poisson process is determined by measuring the time intervals separating the main pulses (17).

6. Method as in claim 1, also characterized in that the fraction on the right of the equation in said unpiling formula is developed in a power series to determine the coefficients of said series.

7. Method as in claim 6, characterized in that the coefficients of said power series are identified with the coefficients $\alpha^{t-Kt(s)}$ contained in the term on the left of the equation in said unpiling formula to determine said probability density $h_{t,e}$ relating to the Duration-Energy pairs (Di,Ei) of the elementary pulses (15).

8. Method as in claim 6 or 7, characterized in that said determination of the coefficients of the power series and said step to identify coefficients each comprise at least one discrete convolution calculation.

9. Method as in claim 7, characterized in that said coefficient identification step also comprises a positivity constraint test (217).

10. Method as in claim 1, characterized in that the main pulses are representative of main flows each possibly containing a pileup of elementary flows, each elementary flow being represented by an elementary pulse.

11. Method as in claim 10, characterized in that the flows are flows of photons (3).

12. Method as in claim 11, characterized in that the photons (3) are gamma photons.

13. Method as in claim 11 or 12, characterized in that an energy of each flow of photons (3) is estimated by the energy of the corresponding pulse, and in that the energy of each pulse is estimated in relation to the area (13) under each corresponding pulse.

14. Method as in claim 1, characterized in that it comprises an initial measurement step of said signal containing a succession of main pulses representative of physical phenomena.

15. Method as in claim 1, characterized in that it comprises at least one step of providing the user with data on said signal.

16. Method as in claim 15, characterized in that said data relates to elementary flows.

17. Method as in claim 16, characterized in that said data concerns the energy Ei of the elementary pulses representative of the elementary flows.

18. Method as in claim 5, characterized in that said formula links a discreet probability law of the Duration-Energy pairs (D,E) of the main pulses, with a discrete probability law of the Duration-Energy pairs (Di,Ei) of the elementary pulses.

19. Method as in claim 18, characterized in that in the step to determine Duration-Energy pairs (Di,Ei), the discreet probability law of the Duration-Energy pairs (D,E) is estimated using constructed Duration-Energy pairs (D,E) and a number of occurrences associated with each said pair (D,E), said occurrences having been determined previously from said measurements.

20. Method as in any of claims 5, 18, or 19, characterized in that said formula is also dependent on the intensity λ of the Poisson process.

21. Method as in claim 5, characterized in that it comprises an initial measurement step of said signal containing a succession of main pulses representative of physical phenomena.

22. Measurement method comprising the processing of a signal (11) containing a succession of main pulses (17) of duration D and energy E, spaced in time from each other and each consisting of a pile-up of elementary pulses (15) of duration Di and whose energy is evaluated by a variable Ei having an additive property, said elementary pulses (15) having times of arrival Ti which follow a homogeneous Poisson process of intensity λ, wherein the method comprises the steps of:

digitizing said signal to obtain data (24) representative thereof, from said data (24):

measuring the duration D and energy E of each main pulse (17) to construct Duration-Energy pairs (D,E), determining the energy pairs (Di,Ei) of the elementary pulses (15) from the constructed pairs (D,E), by solving an unpiling formula linking a function of the Duration-Energy pairs (D,E) of the main pulses with a function of the Duration-Energy pairs (Di,Ei) of the elementary pulses, deducing the energy Ei of each elementary pulse from the determined energy pairs (Di, Ei), wherein the step to deduce the energy Ei of each elementary pulse (15) comprises a step to determine a discrete probability law of these energies.

23. Method as in claim 22, characterized in that said formula links a discreet probability law of the Duration-Energy pairs (D,E) of the main pulses, with a discrete probability law of the Duration-Energy pairs (Di,Ei) of the elementary pulses.

24. Method as in claim 23, characterized in that in the step to determine Duration-Energy pairs (Di,Ei), the discreet probability law of the Duration-Energy pairs (D,E) is estimated using constructed Duration-Energy pairs (D,E) and a number of occurrences associated with each said pair (D,E), said occurrences having been determined previously from said measurements.

25. Method as in any of claims 22-24, characterized in that said formula is also dependent on the intensity λ of the Poisson process.

26. Method as in claim 22, characterized in that the discrete probability law of energies is a marginal probability law, according to energy, of the discrete probability law of the Duration-Energy pairs (Di,Ei).

27. Method as in claim 23, characterized in that it comprises an initial measurement step of said signal containing a succession of main pulses representative of physical phenomena.

* * * * *

UNITED STATES PATENT AND TRADEMARK OFFICE
CERTIFICATE OF CORRECTION

PATENT NO. : 7,728,307 B2
APPLICATION NO. : 11/579757
DATED : June 1, 2010
INVENTOR(S) : Eric Barat et al.

Page 1 of 1

It is certified that error appears in the above-identified patent and that said Letters Patent is hereby corrected as shown below:

In the specification, Column 9, at lines 15 - 20, Formula 2, please delete "$z's^e$", insert --$z^t s^e$--.

In the specification, Column 12, after line 17, please insert the title --Step Two: Identification of Coefficients--.

In the specification, Column 13, at lines 26, 34 and 51, please delete "$(k_{t,e})^{(e)*n}$" and insert --$(k_{t,e})^{(e)*}{}_n$--.

Signed and Sealed this
Twenty-fifth Day of October, 2011

David J. Kappos
*Director of the United States Patent and Trademark Office*